(12) United States Patent
Sakamoto

(10) Patent No.: US 7,354,073 B2
(45) Date of Patent: Apr. 8, 2008

(54) PIPE JOINT

(75) Inventor: Kouichi Sakamoto, Osaka (JP)

(73) Assignee: Waterworks Technology Development Organization, Co., Ltd., Osaka (JP)

( * ) Notice: Subject to any disclaimer, the term of this patent is extended or adjusted under 35 U.S.C. 154(b) by 316 days.

(21) Appl. No.: 11/092,215

(22) Filed: Mar. 29, 2005

(65) Prior Publication Data

US 2005/0218652 A1     Oct. 6, 2005

(30) Foreign Application Priority Data

Mar. 30, 2004    (JP)    ............... 2004-100303

(51) Int. Cl.
*F16L 17/00*    (2006.01)
(52) U.S. Cl. .............. 285/113; 285/104; 285/342; 285/374
(58) Field of Classification Search ............. 285/104, 285/108, 113, 342–343, 374
See application file for complete search history.

(56) References Cited

U.S. PATENT DOCUMENTS

| | | | | |
|---|---|---|---|---|
| 1,866,726 A | * | 7/1932 | Santiago | 285/104 |
| 1,979,255 A | * | 11/1934 | Engel et al. | 285/337 |
| 3,986,730 A | * | 10/1976 | Martelli et al. | 285/23 |
| 4,648,633 A | * | 3/1987 | Bergmann | 285/337 |
| 5,803,513 A | * | 9/1998 | Richardson | 285/342 |
| 6,203,073 B1 | | 3/2001 | Sato et al. | |
| 6,371,530 B1 | | 4/2002 | Sato et al. | |
| 6,481,762 B1 | * | 11/2002 | Rex et al. | 285/337 |
| 6,773,040 B2 | | 8/2004 | Saito et al. | |

FOREIGN PATENT DOCUMENTS

| | | |
|---|---|---|
| EP | 0 899 495 A2 | 3/1999 |
| JP | 2001-050446 | 2/2001 |
| JP | 2001-90895 A | 4/2001 |
| JP | 2002-228064 A | 8/2002 |
| JP | 2003-042359 | 2/2003 |
| JP | 2004-340365 | 12/2004 |

* cited by examiner

*Primary Examiner*—Aaron Dunwoody
*Assistant Examiner*—Fannie C. Kee
(74) *Attorney, Agent, or Firm*—Knobbe Martens Olson & Bear, LLP

(57) ABSTRACT

A pipe joint includes a push ring having a tapered receptacle and fitted to a junction pipe; a pipe joint main body having a pipe receptacle and fitted to the junction pipe; a clamp for moving the push ring toward the joint main body; a packing ring disposed between the pipe joint main body and the junction pipe and fitted into the pipe receptacle; an anti-slip ring disposed between the push ring and the junction pipe and cleaved at one position; an elastic member disposed between the push ring and the packing ring, to press the anti-slip ring toward the tapered receptacle and the junction pipe; and a spacer disposed between the packing ring and the elastic member.

6 Claims, 20 Drawing Sheets

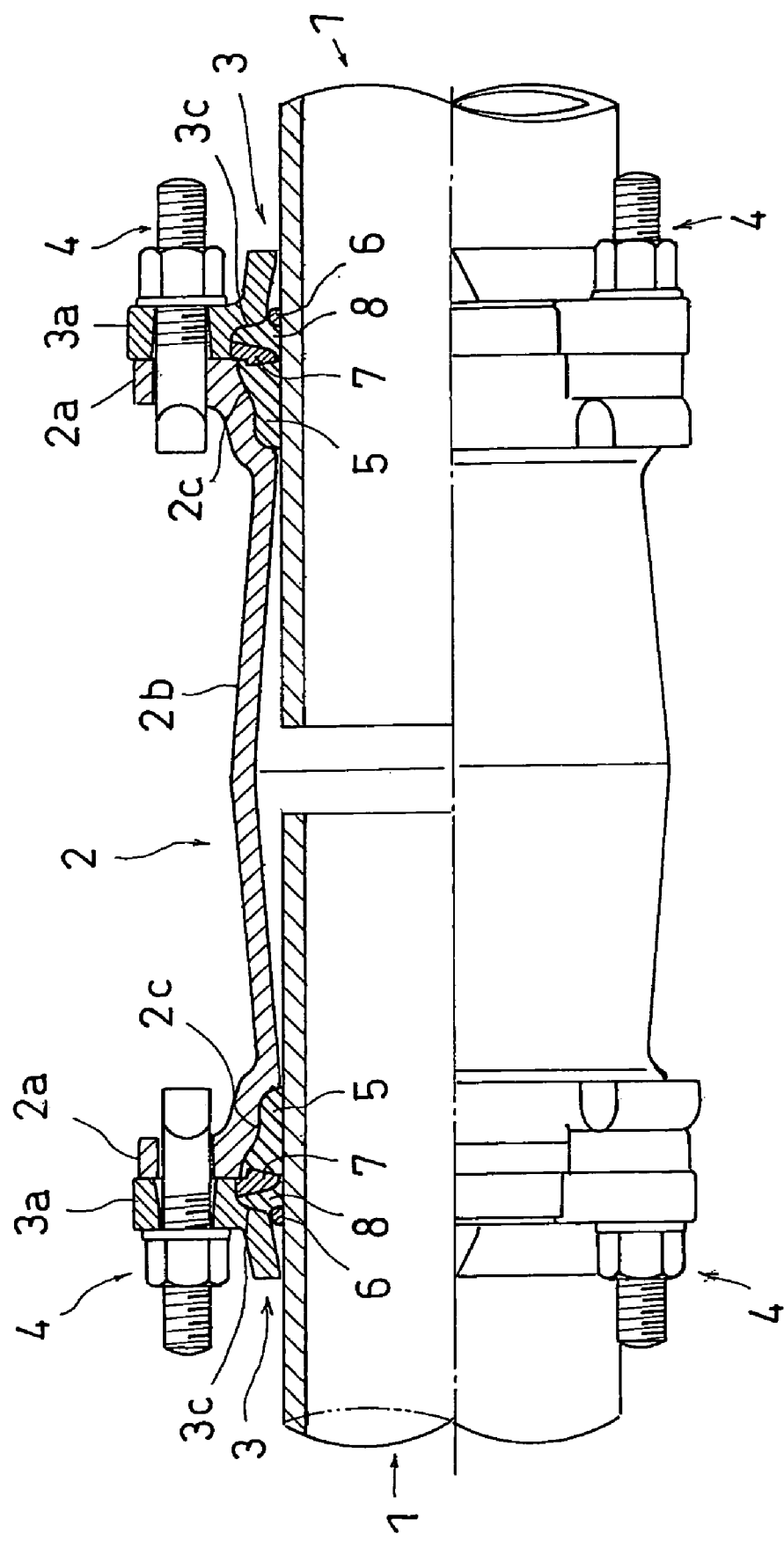
[FIG. 1]

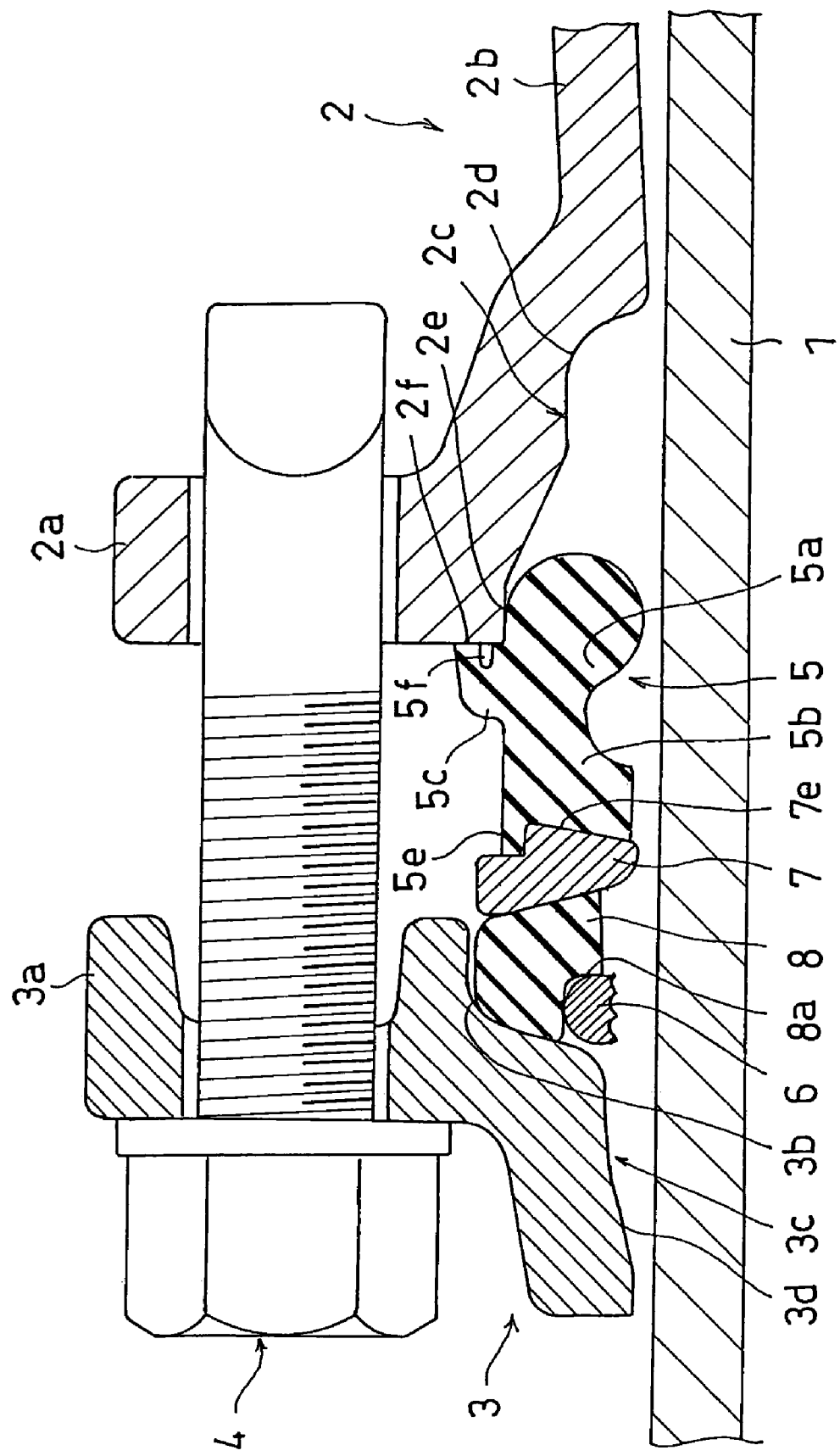
[FIG. 2]

[FIG. 3]
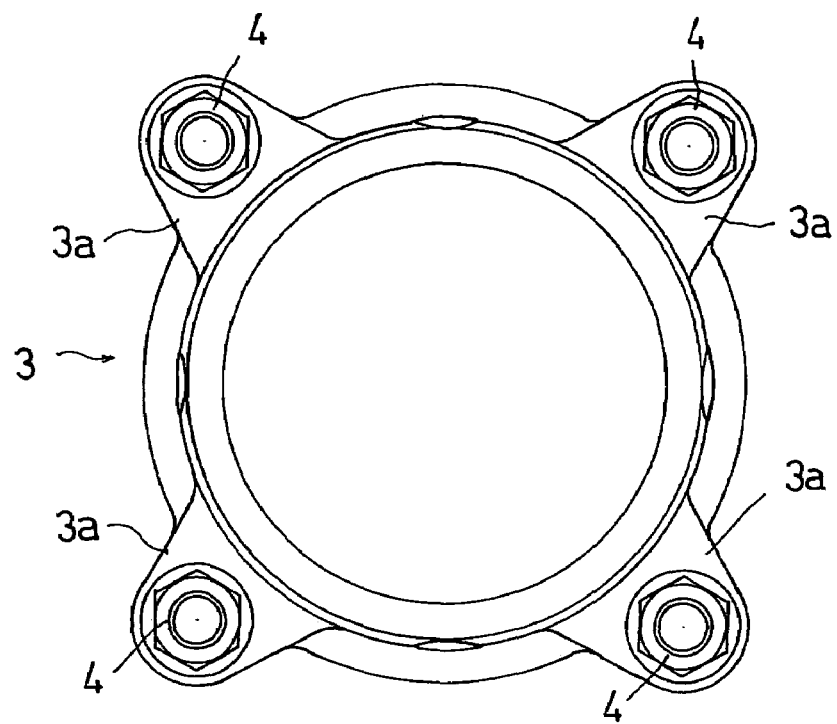
[FIG. 4]
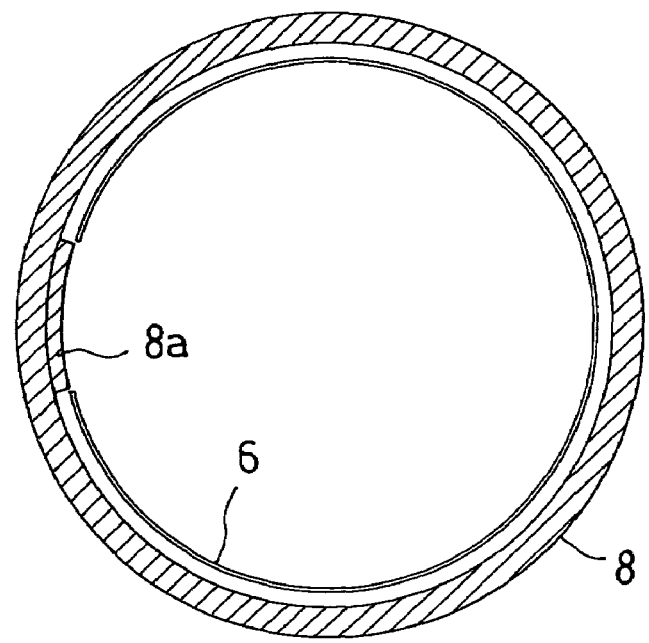

[FIG. 5]
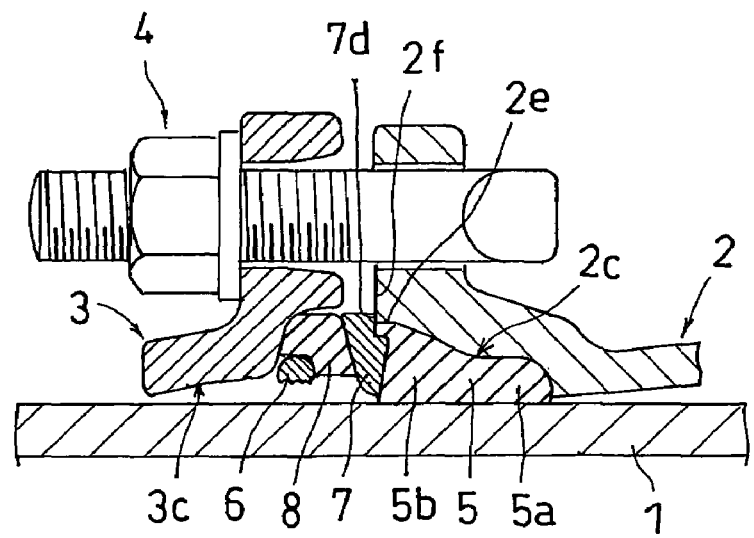
[FIG. 6]
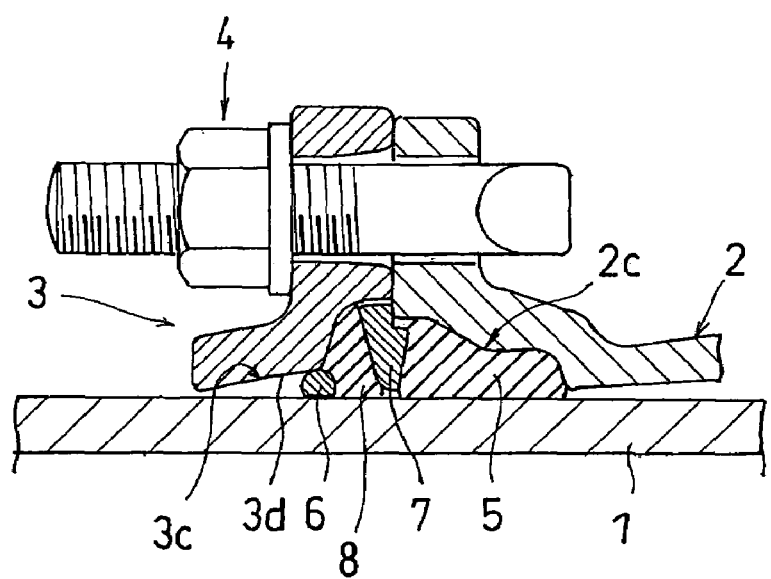

[FIG. 7]
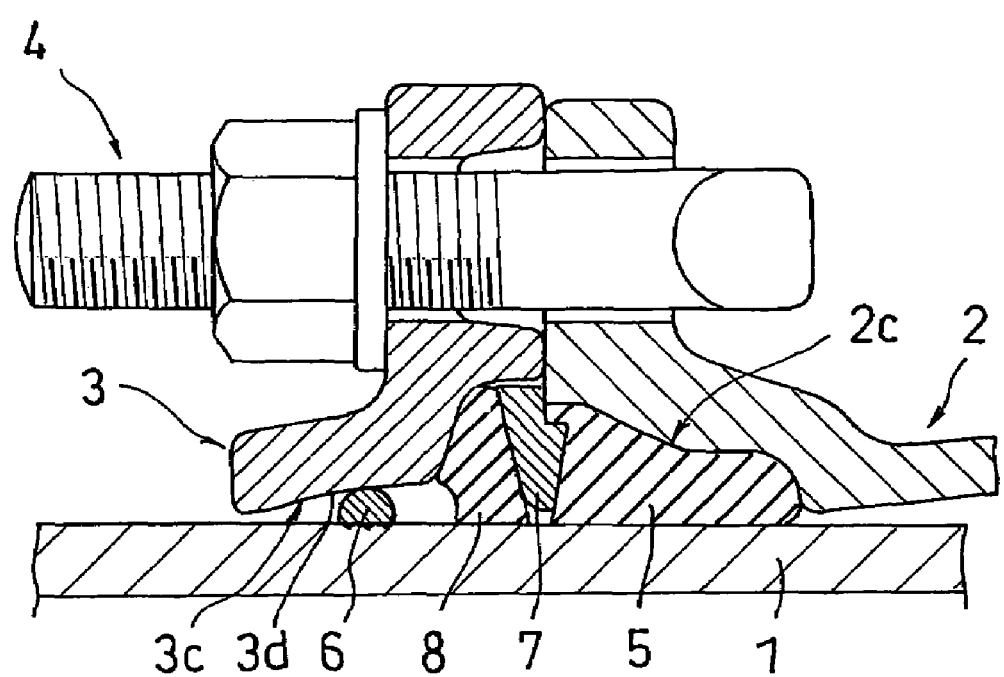

[FIG. 8]
(a)
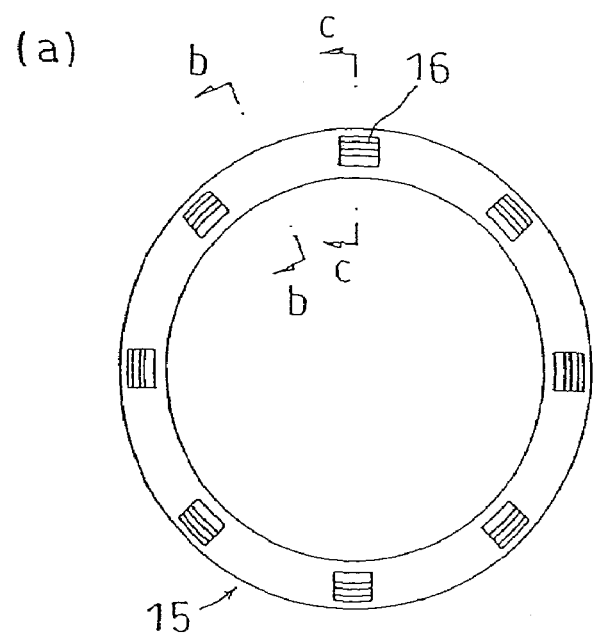
(b)
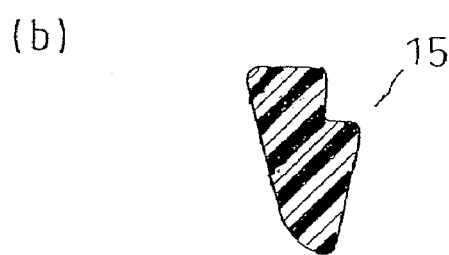
(c)
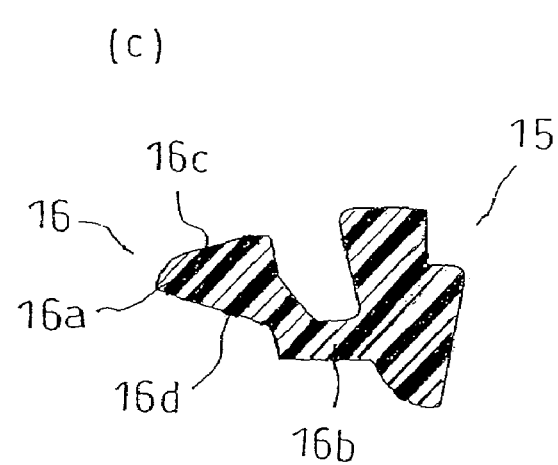

[FIG. 9]
(a)
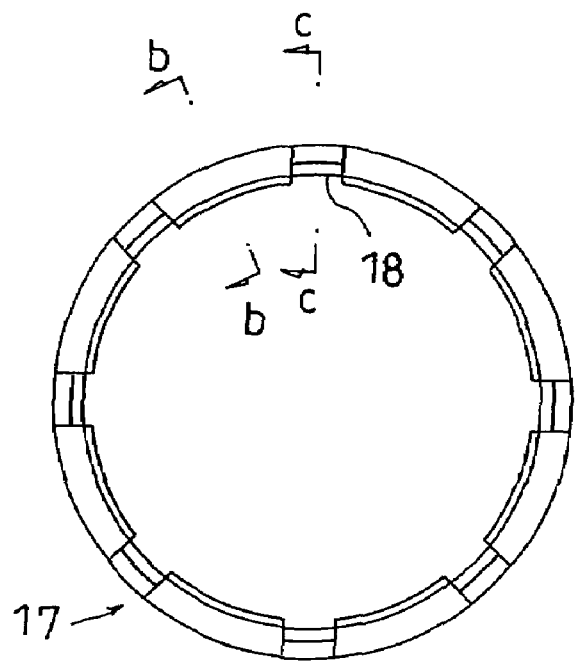
(b)
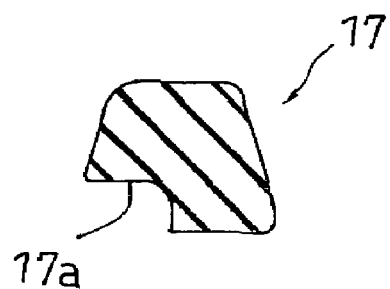
(c)
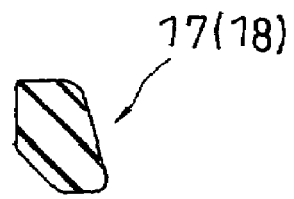

[FIG. 10]
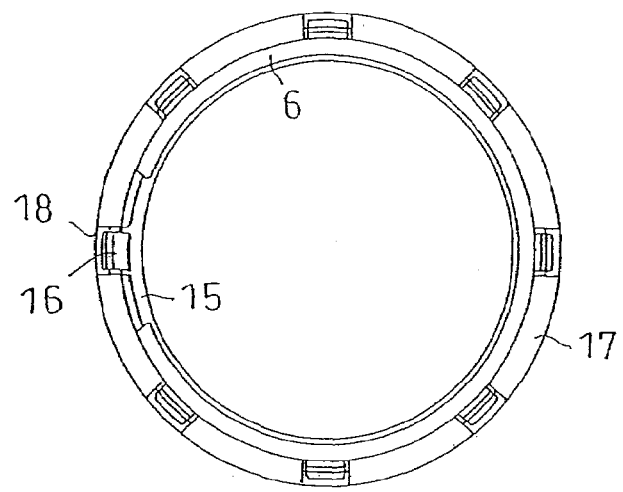
[FIG. 11]
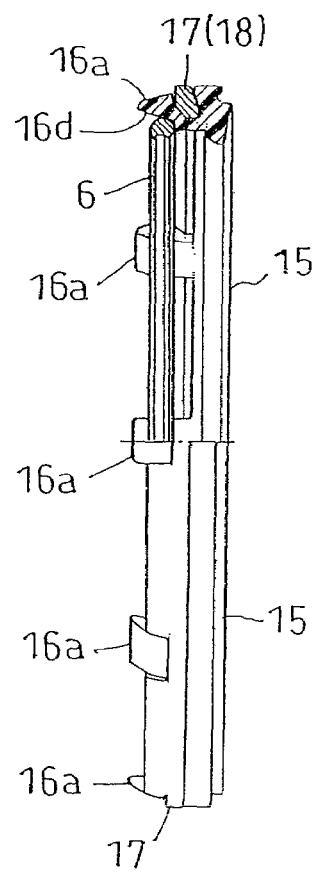

[FIG. 12]
(a)
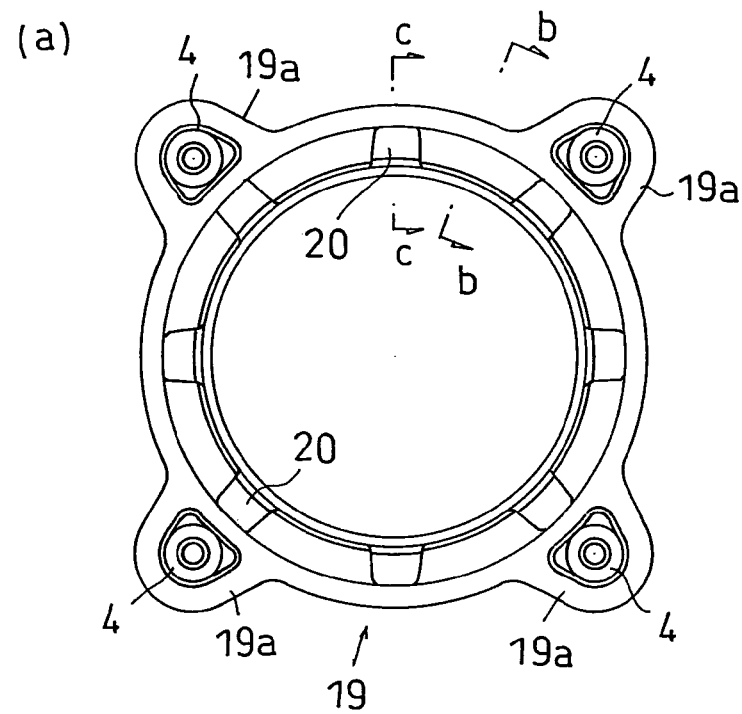
(b)
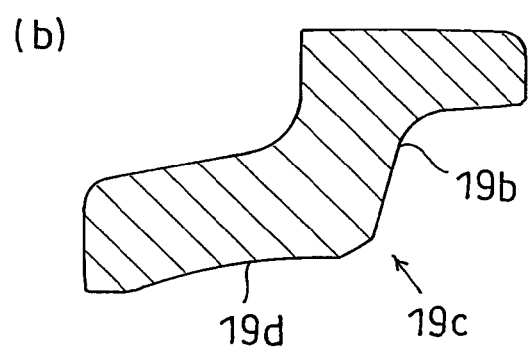
(c)
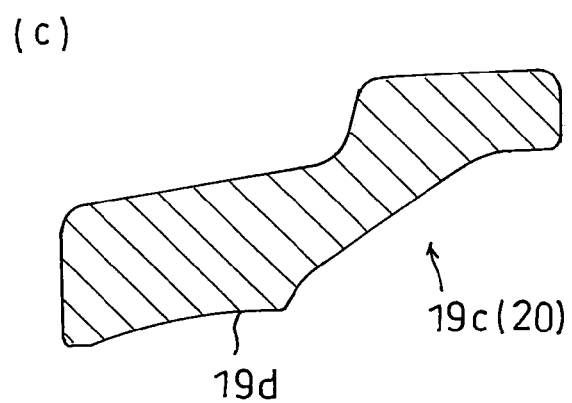

[FIG. 13]
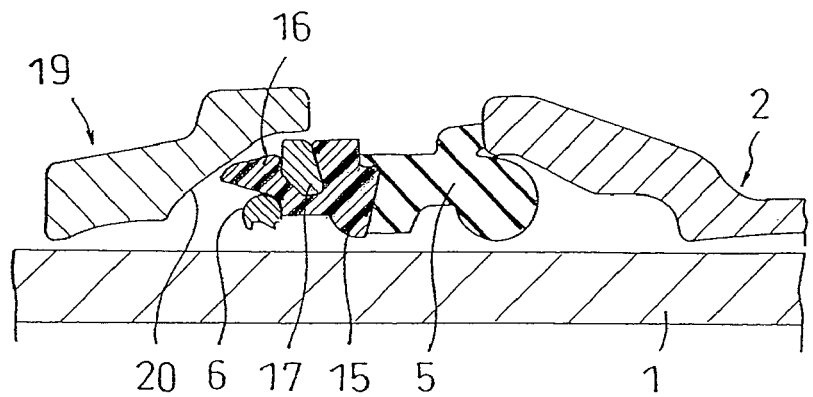
[FIG. 14]
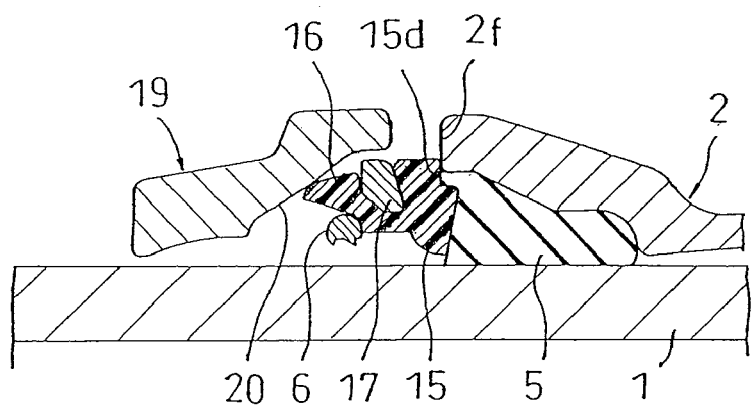
[FIG. 15]
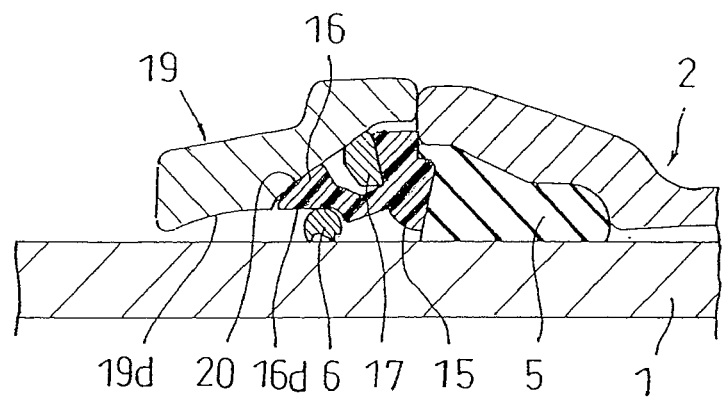

[FIG. 16]
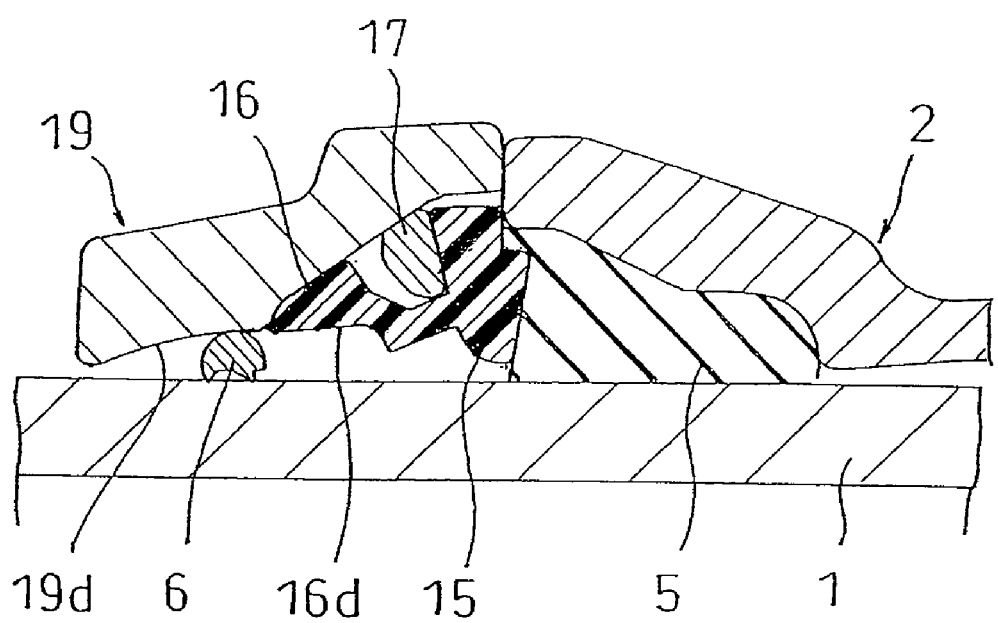

[FIG. 17]
(a)
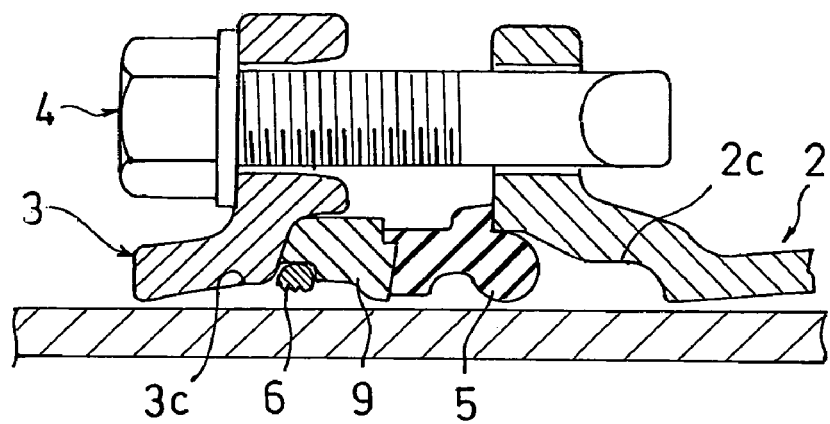
(b)
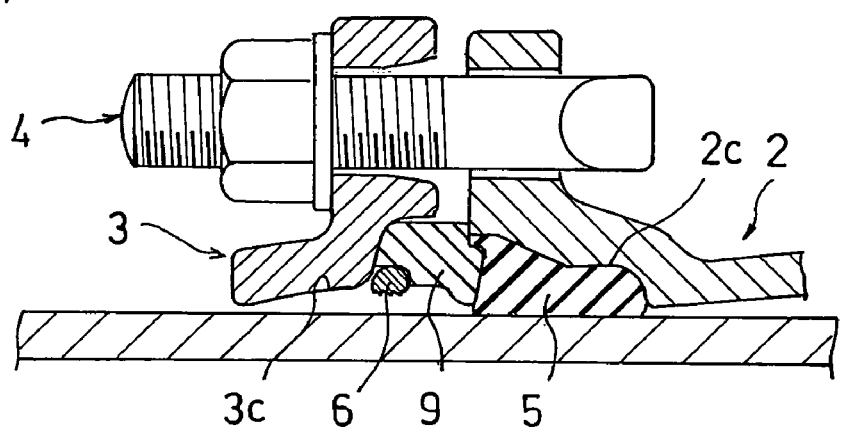
(c)
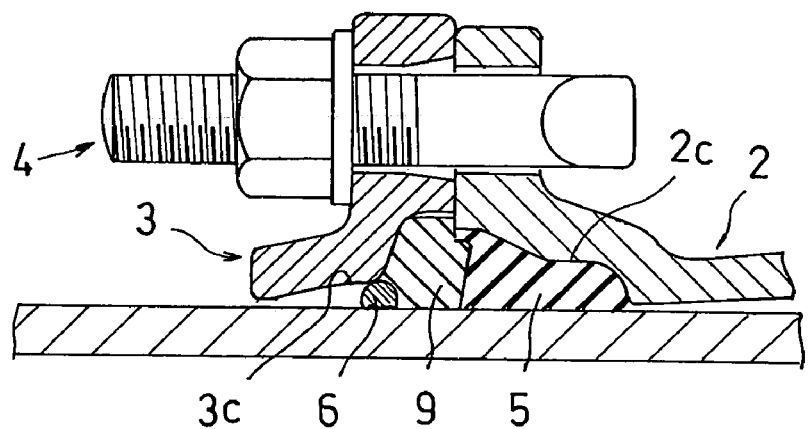

[FIG. 18]
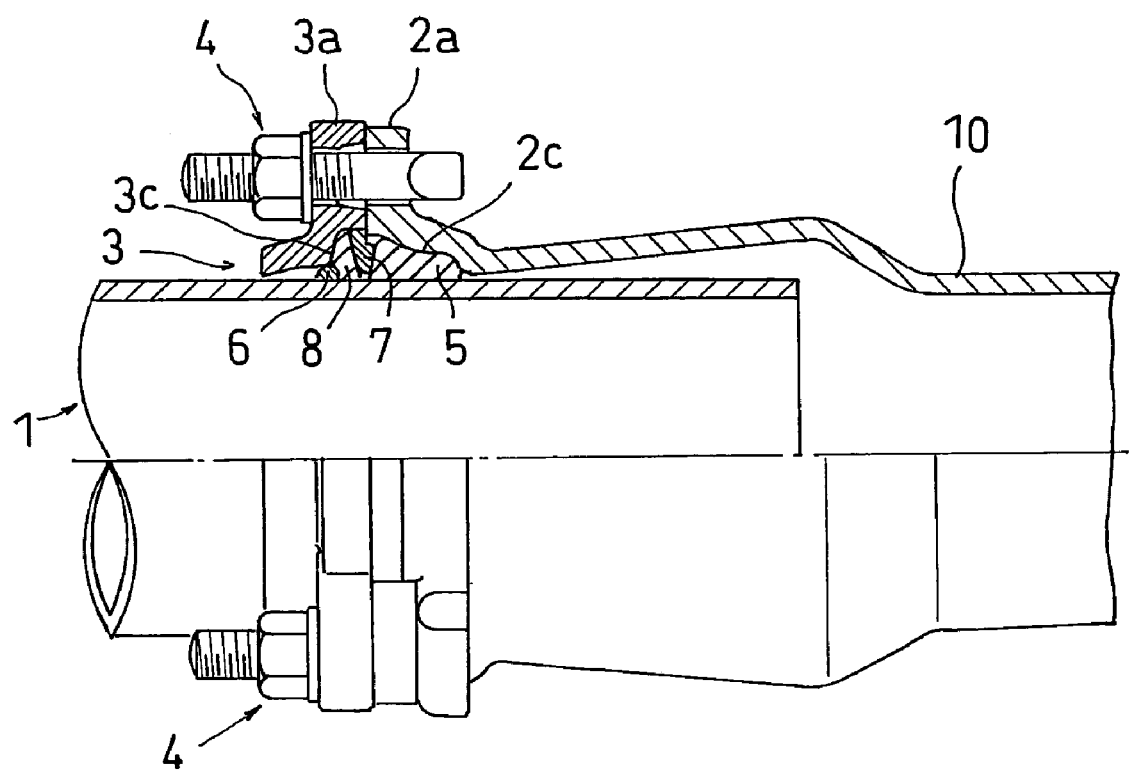

[FIG. 19]
(a)
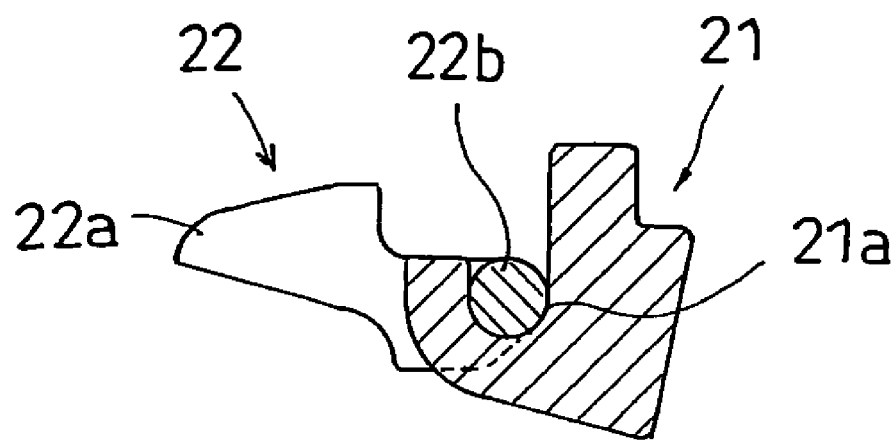
(b)
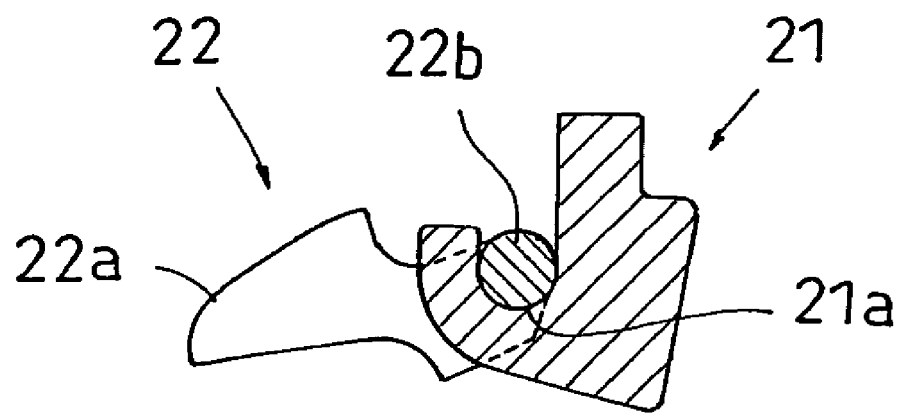

[FIG. 20]
(a)
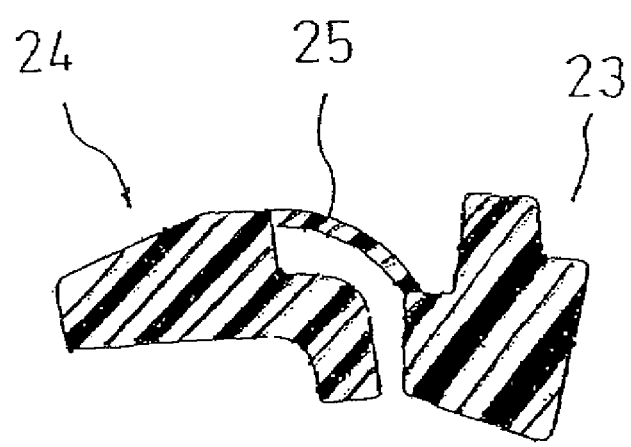
(b)
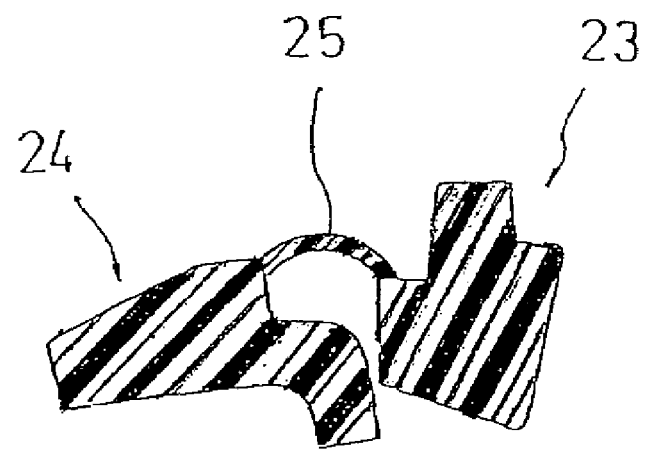

[FIG. 21]
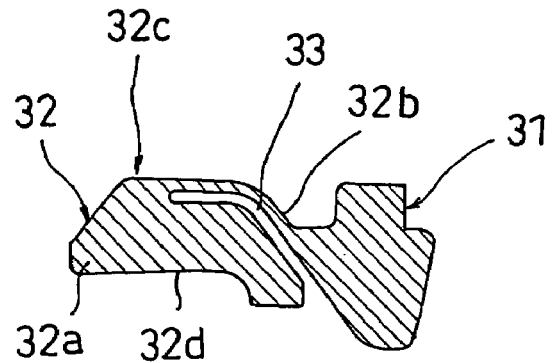
[FIG. 22]
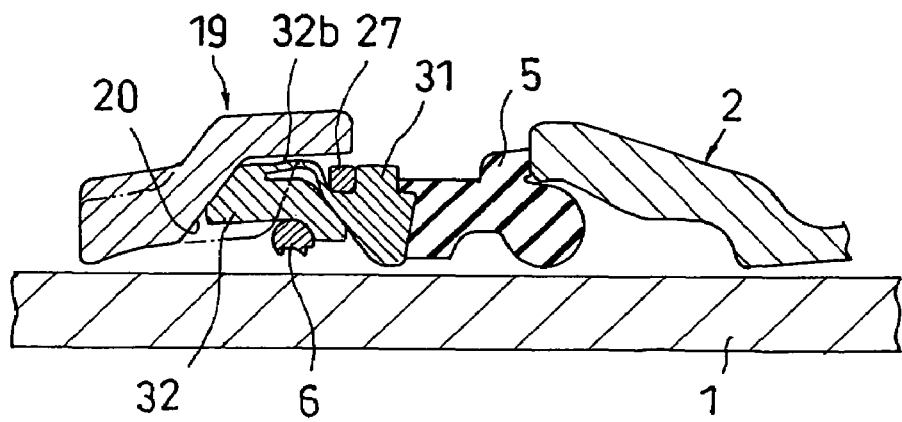
[FIG. 23]
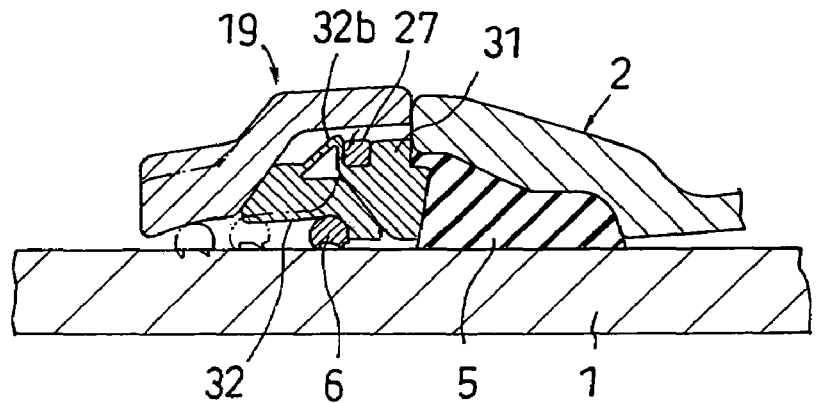

[FIG. 24]  (PRIOR ART)
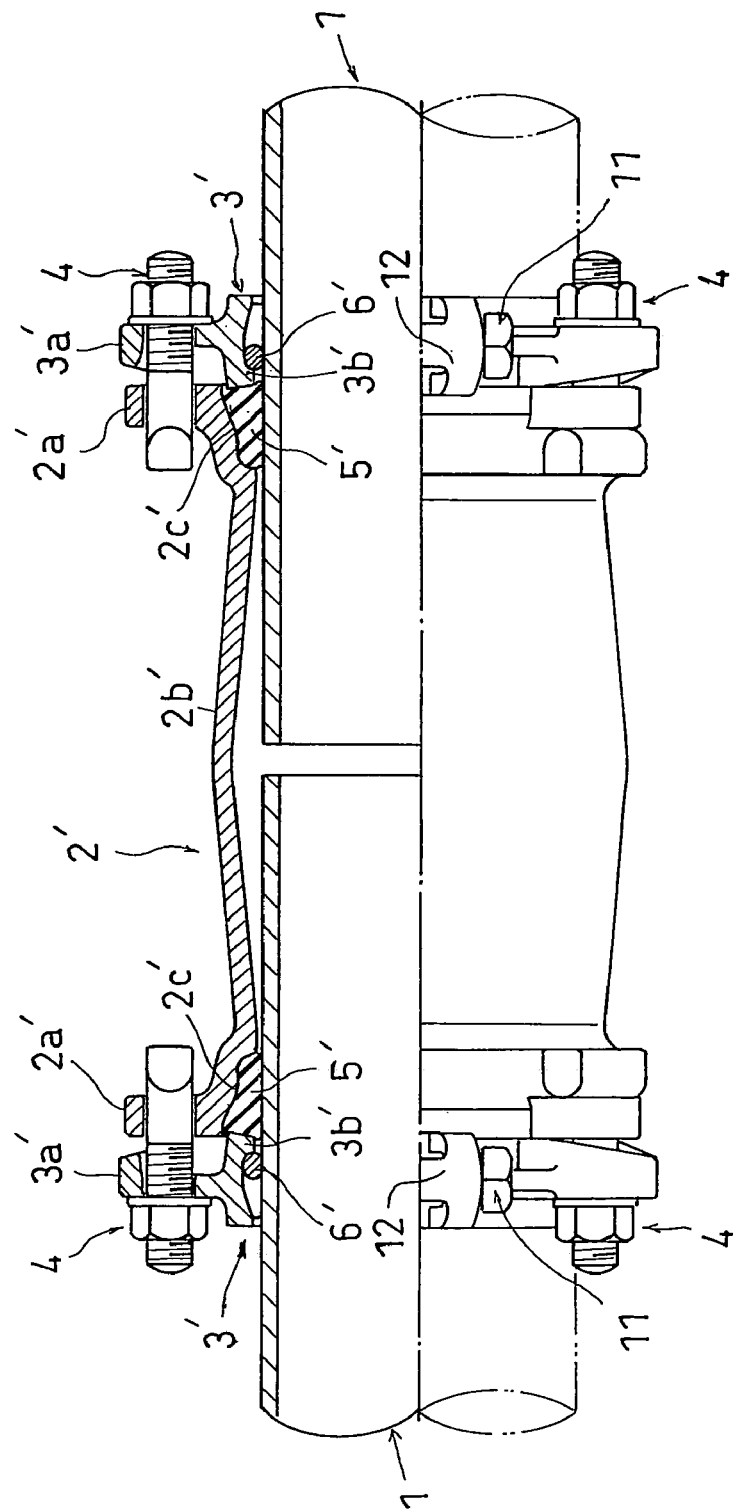

[FIG. 25] (PRIOR ART)
(a)
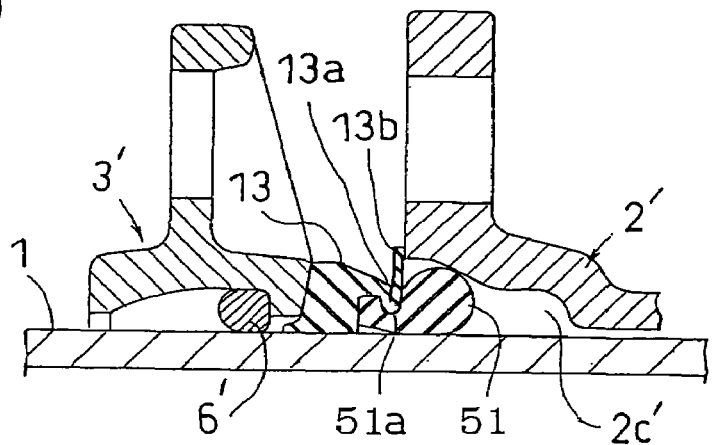
(b)
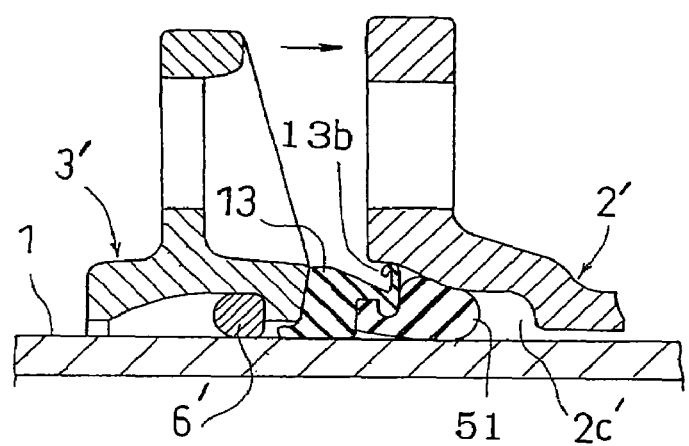
(c)
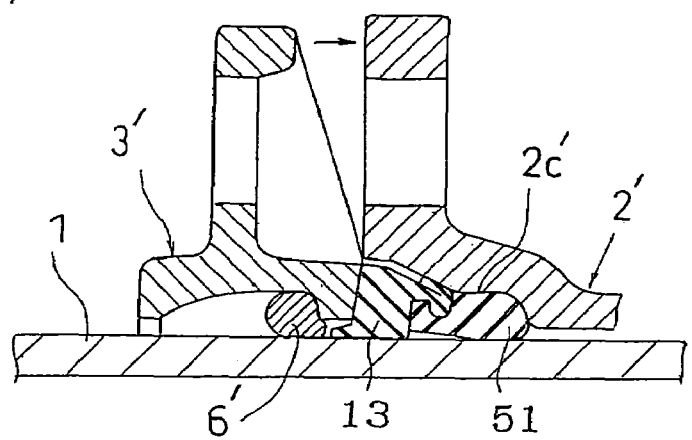

[FIG. 26] (PRIOR ART)
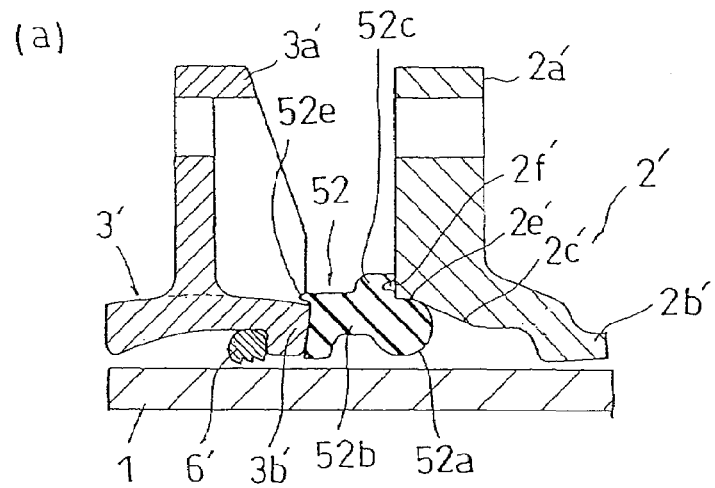
(a)
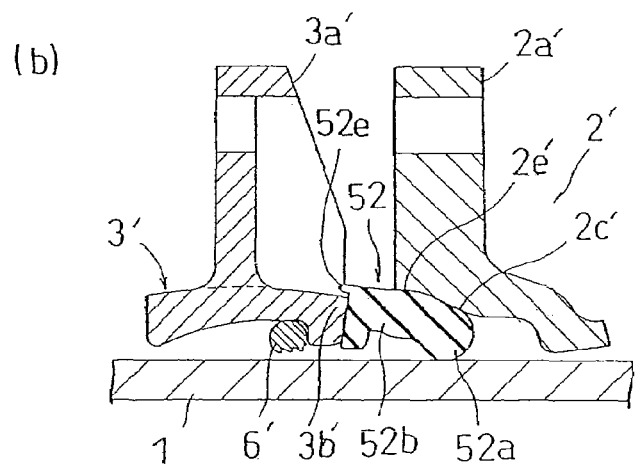
(b)
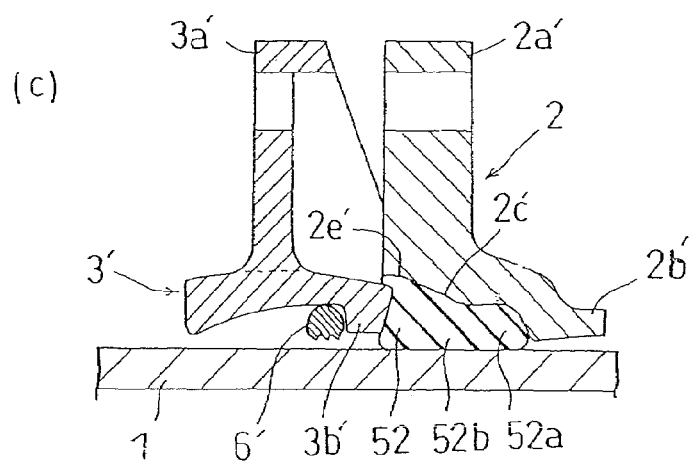
(c)

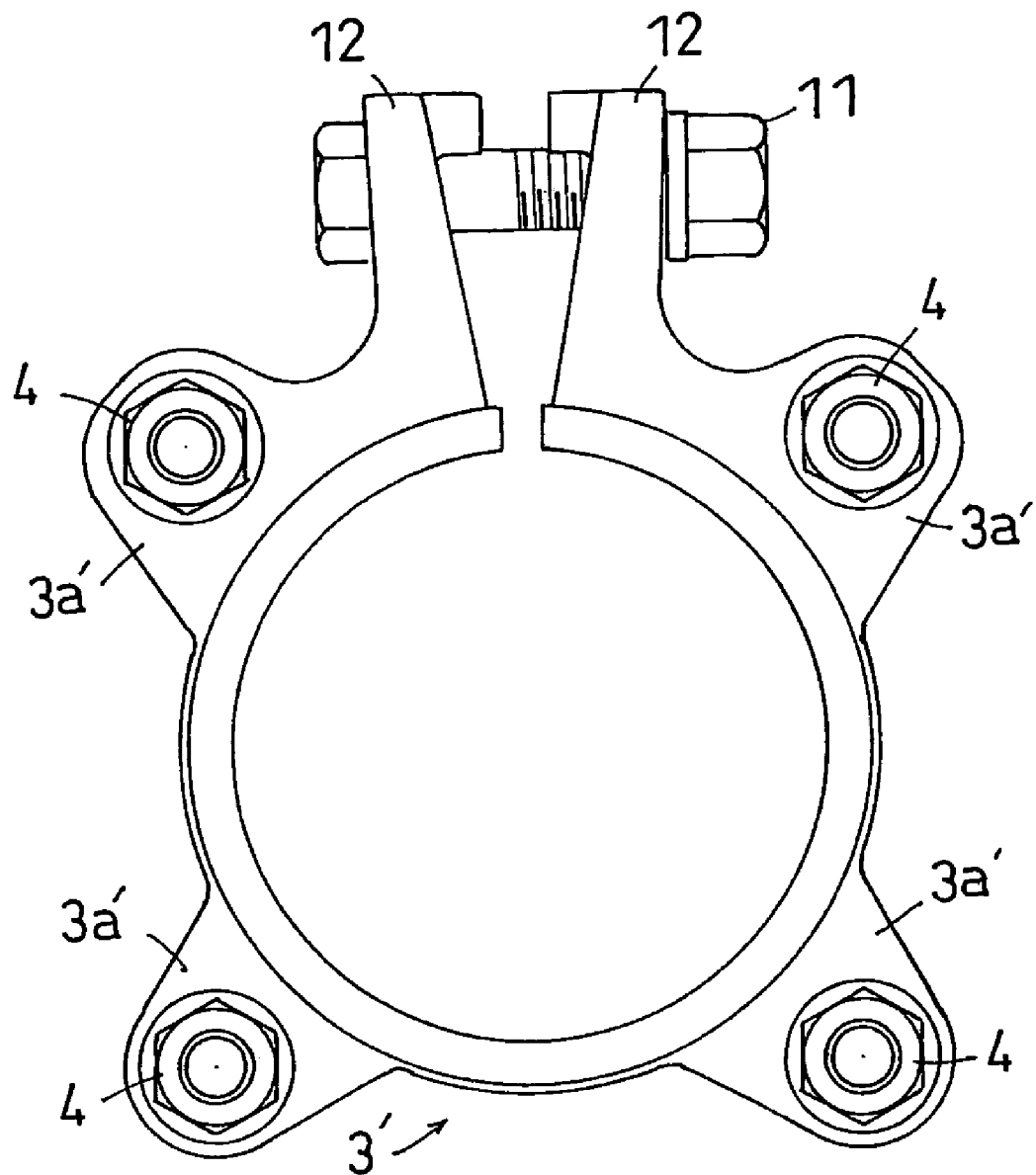
[FIG. 27] (PRIOR ART)

PIPE JOINT

BACKGROUND OF THE INVENTION

1. Field of the Invention

The present invention relates to a pipe joint.

2. Description of the Related Art

FIG. 24 shows an example of a conventional pipe joint used for connecting metal or resin water pipes. This pipe joint is interposed between junction pipes 1 facing each other on axis to join water-tightly, and is composed to tighten a pipe joint main body 2' and a pair of right and left push rings 3' by means of a clamp 4. The pipe joint main body 2' includes a shell 2b' formed integrally between mutually facing flange-shaped protrusion 2a' and protrusion 2a', and a tapered receptacle 2c' spreading widely in the end direction of the inner peripheral side of the protrusion 2a'. The push ring 3' has a flanged protrusion 3a', and is disposed at both ends of the pipe joint main body 2' disposed to leave a peripheral gap on the outer circumference of the junction pipe 1. By tightening the clamp 4, a rubber packing ring 5' set between the pipe joint main body 2' and each of push rings 3' is pressed by the leading end 3b' of the push ring 3, and is inserted into the receptacle 2c', and is also pressed against the outer circumference of the junction pipe 1, so that the junction pipes 1 are coupled to each other (Japanese unexamined patent publication No. 2003-42359). The coupled junction pipes 1 are expandable and flexible at the junction.

Conventionally, in order to enhance the working efficiency at the site of installation, the pipe joint has been temporarily assembled. In this preliminary assembly, the rubber packing ring and other necessary parts are preliminarily position in the radial direction and axial direction. An example of temporarily assembled pipe joint is shown in FIG. 25(a). In this pipe joint, a stopping bump 13a of annular spacer 13 is engaged with a stopping recess 51a of rubber packing ring 51, and the leading end of the rubber packing ring 51 is inserted into the receptacle 2c' of the pipe joint main body 2', and further the clamp (not shown) of the push ring 3' is tightened until a positioning protrusion 13b of annular spacer 13 abuts against the corner of opening edge of the receptacle 2c' of the pipe joint main body 2', thereby assembling temporarily (Japanese patent publication No. 3061136).

Another pipe joint without such an annular spacer is proposed, in which the pipe joint is used for temporary assembly. In the pipe joint shown in FIG. 26(a), a stopper 52c provided at base 52b of rubber packing ring 52 abuts against a receptacle peripheral outer side 2f of pipe joint main body 2', and a tip 52a of rubber packing ring is provisionally stopped in receiving hole 2e' at the inlet of receptacle 2c'. The leading end 3b' of the push ring 3' moved by tightening of the clamp (not shown) is fitted to the outer peripheral side 52e of the base 52b of the rubber packing ring 52, and is assembled temporarily (Japanese unexamined patent publication No. 2003-42359).

At the time of installation, the junction pipe 1 is inserted into the temporarily assembled pipe joint, and by moving the push ring 3 by tightening the clamp, as shown in FIGS. 25(b) and (c), or in FIG. 26(b) and (c), the rubber packing rings 51, 52 are tightly coupled with the receptacle 2c' in wedge form, and are compressed to the outer circumference of the junction pipe 1, and the junction pipe 1 is joined.

As shown in FIGS. 24 to 26 an anti-slip ring 6' is provided at the inner peripheral side of the push ring 3', and it is engaged with the outer side of the junction pipe 1, thereby preventing its detachment. Also as shown in FIG. 24 and FIG. 27, the push ring 3' is separated at one position in the circumferential direction, and by tightening a stopper 11, it is composed to be contracted in diameter. At the time of installation, after tightening the clamp 4, the stopper 11 is tightened to contract the diameter of the push ring 3', and the anti-slip ring 6' is compressed and engaged with the outer surface of the junction pipe 1, and detaching is prevented.

However, since the conventional push ring has such stopper, the shape is complicated, having a stopper boss 12 as shown in FIG. 24 and FIG. 27, and extra material and process are needed for production of push ring. Also at the time of installation, since the tightening process of stopper is needed, the working efficiency has been disturbed.

SUMMARY OF THE INVENTION

It is hence an object of the invention to provide a pipe joint capable of reducing the product cost of push ring and excellent in efficiency of installation.

This object is achieved by the invention characterized as follows. That is, the pipe joint of the invention comprises:

a push ring, having a protrusion on outer circumference and fitted into the outer circumference at one end of junction pipe, a pipe or pipe joint main body, having a protrusion facing the protrusion at the side facing the push ring, having a pipe receptacle expanding toward the push ring at the inner peripheral side of this protrusion, and fitted to the outer circumference of the junction pipe across a peripheral gap, a clamp, capable of moving and operating the push ring in a direction of the pipe or pipe joint main body, a packing ring, disposed between inner and outer circumference of the pipe or pipe joint main body, and junction pipe, and fitted into the pipe receptacle by the own elastic deformation generated by the pressing force of the push ring moving by operation of the clamp, and an anti-slip ring disposed between inner and outer circumference of the push ring and junction pipe, and separated at one position in the circumferential direction, wherein the push ring is an annular form not having separated position in the peripheral direction, and a tapered push ring receptacle spreading toward the pipe or pipe joint main body at its inner peripheral side, an elastic member is disposed between the push ring and packing ring, and by the own elastic deformation caused by pressing force of the push ring moved by operation of the clamp, the anti-slip ring is compressed to the junction pipe outer surface, while being press-fitted into the push ring receptacle and a spacer is disposed between the packing ring and elastic member, and abuts against the pipe receptacle peripheral outer surface by pressing force of the push ring moved by operation of the clamp.

According to this pipe joint, the anti-slip ring separated at one position in the peripheral direction is press-fitted into the tapered push ring receptacle by elastic deformation of the elastic member, and the anti-slip ring can be expanded and contracted in diameter without using diameter contracting mechanism as in the conventional stopper. Hence, the push ring does not require diameter contracting mechanism such as stopper, and the push ring can be formed in an annular form not having separated position in the peripheral direction. As a result, materials and manufacturing process necessary for production of push ring can be saved, and the production cost is curtailed. Elastic deformation of elastic member occurs along with pressing force of moving push ring, any special process is not needed, and by the ordinary operation of clamp at the time of installation only, stopping of water by fitting of packing ring, and release prevention by compression of anti-slip ring can be achieved easily and securely. Further, by disposing the spacer between the packing ring and elastic member, pressing force transmitted from the push ring to the elastic member can be securely transmitted up to the packing ring. Since this spacer abuts against the outer face of the pipe receptacle outer periphery along with the pressing force of the push ring moved by operation of the push ring, the pushing extent of the packing ring into the pipe receptacle at the time of installation can be controlled.

The push ring receptacle has an opening at the spreading side, and a taper at closing side, and the elastic member is disposed at the opening inner peripheral side, and the anti-slip ring is preferred to be press-fitted to the taper by elastic deformation of the elastic member.

In this constitution, the elastic member deformed elastically by the pressing force of the push ring moved by operation of the clamp can preferably press-fit the anti-slip ring into the push ring receptacle. Since the anti-slip ring is separated at one position in the peripheral direction, it is contracted in diameter as being press-fitted into the taper, and is compressed to the junction pipe outer side, and release preventive effect is achieved.

Preferably, only the anti-slip ring should be press-fitted into the taper of the push ring.

If axial force acts on the junction pipe due to water pressure or earthquake, the anti-slip ring slides together with the junction pipe at the taper inner peripheral side, and the conduit is expanded or contracted. By forming the sliding member only of the anti-slip ring, the conduit expands or contracts smoothly, and damage of siding member is suppressed, and durability of the pipe joint is enhanced.

Herein, the packing ring has a tip at the pipe reception side, and a base at the push ring side, and in order that the tip may be stopped temporarily at the inlet of the pipe receptacle on its outer periphery, its diameter is nearly same as the inside diameter of the pipe receptacle, and the base is larger than the outside diameter of the tip on the outer periphery at the position linking with the tip, thereby serving as stopper abutting against the pipe receptacle peripheral outer side, which is preferable.

In this configuration, the stopper at the base of the packing ring abuts against the pipe receptacle peripheral outer side, and the tip of the packing ring is temporarily stopped at the inlet of pipe receptacle, and the push ring moved by operation of the clamp abuts against the push ring side end surface of the base of the packing ring by way of the spacer or the like, thereby assembling temporarily. When the push ring is moved by operation of the clamp in the state of the junction pipe inserted into the temporarily assembled pipe joint, by the pressing force by the move of the push ring, the packing ring elastically deformed by itself including the stopper, and gets into the inner side of the pipe receptacle, tightly coupling with the pipe receptacle in wedge form, and is also pressed to the outer periphery of the junction pipe, and the packing ring is fitted and the junction pipe is joined.

Instead of the elastic member and spacer, an elastic ring spacer may be preferably disposed between the push ring and the packing ring, which abuts against the pipe receptor peripheral outer side along with pressing force of the push ring moved by operation of the clamp, and is compressed to the junction pipe outer side while press-fitting the anti-slip ring into the push ring receptacle by the own elastic deformation caused by this pressing force.

By using the elastic ring spacer in place of the elastic member and spacer, the number of members to be assembled temporarily is decreased, and it is easier to position in the radial direction and axial direction of the packing ring and others. Since the temporary assembly is not collapsed by breakage of spacer, when transporting the pipe joint to the site of installation in temporarily assembled state, the temporarily assembled state of the pipe joint is hardly deformed. It is hence easier to handle the pipe joint, and it is beneficial from the aspects of ease and cost of installation.

The spacer is preferably provide with protrusions moving along the inner periphery of the push ring receptacle along with pressing force of the push ring moved by operation of the clamp, and compressing the anti-slip ring against the outer side of the junction pipe.

In this constitution, when coupling the junction pipes by operation of clamp, the anti-slip ring can be compressed to the outer face of the junction pipe not only by the elastic deformation of the elastic member but also by the move of the protrusions, and thereby a stronger release preventive effect is obtained. Moreover, the move of the protrusions works along the inner periphery of the push ring receptacle along with the pressing force of the push ring moved by operation of the clamp, it is enough with ordinary operation at the time of installation, and the action and effect can be obtained without spoiling the ease of installation.

Herein, the protrusions are preferred to be provided by a plurality at a specified pitch in the peripheral direction of the spacer.

Since a plurality of protrusions are provided at a specified pitch in the peripheral direction of the spacer, when the push ring is moved by operation of the clamp, at the inner peripheral side of the clamp, the anti-slip ring can be contracted in a region spreading somewhat in the peripheral direction. That is, without allowing local contraction in diameter of the anti-slip ring, it can be contracted uniformly in the peripheral direction, so that it can be press-fitted smoothly into the push ring receptacle.

At the positions confronting the protrusions of the push ring receptacle, it is preferred to dispose recess grooves internally contacting with the protrusions, spreading in a taper toward the pipe or pipe joint main body.

In this configuration, when the push ring is moved by operation of the clamp, the protrusions internally contact with the recess grooves, and move along the taper of the recess grooves, so that the protrusions may be moved smoothly. Since the recess grooves compose the moving route of protrusions, accurate move of the protrusions can be assured. By properly adjusting the depth and taper angle of recess grooves, the moving extent of protrusions about the moving distance of the push ring can be controlled.

The surface confronting the junction pipe outer side of the protrusions moved along the inner periphery of the push ring receptacle forms a taper spreading toward the pipe or pipe joint main body, and is preferred to be positioned nearly on the same level as the inner circumference of the press-fitting region of the anti-slip ring in the push ring receptacle.

In this configuration, when the protrusions are moved along the inner periphery of the push ring receptacle, the surface confronting the junction pipe outer side of the protrusions forms a taper spreading toward the pipe or pipe joint main body, and thereby cooperates with the move of the anti-slip ring when passing water, and the anti-slip ring is more firmly compressed to the junction pipe outer side, so that an excellent release preventive effect is obtained. Moreover, since the surface confronting the junction pipe outer side of the protrusions is positioned nearly on the same level as the inner circumference of the press-fitting region of the anti-slip ring in the push ring receptacle, the anti-slip ring can be securely press-fitted into the push ring receptacle. If the protrusions are moved, the sliding route of the anti-slip ring is assured, and when passing water or in the event of an earthquake, the anti-slip ring slides, together with the junction pipe, at the inner peripheral side of the push ring receptacle or at the inner peripheral side of the protrusions, and release preventive effect is guaranteed.

Preferably, the spacer should be held in the elastic member.

In this configuration, the spacer and elastic member can be handled as one body, and it is easier to position in the radial direction and axial direction of the packing ring and others when assembling temporarily. Since the temporary assembly is not collapsed easily, the temporarily assembled state of the pipe joint can be transported to the side of installation, and it is beneficial from the aspects of ease and cost of installation.

The protrusions are preferred to be supported rotatably on the spacer.

In this configuration, when the push ring is moved by operation of the clamp, the protrusions move smoothly along the inner periphery of the push ring receptacle, and thereby the ease of installation is improved, and damage of protrusions or spacer can be prevented. If once used, it can be easily restored in the original shape, and it can be favorably used again.

The protrusions are extended from the side of the spacer through the coupling unit, and this coupling unit is connected to the outer circumference of the protrusions, and is press-fitted into the push ring, so that the coupling unit may be easily deformed elastically to bulge out.

In this configuration, if assembled in the pipe joint and press-fitted to the push ring, the coupling unit is easily deformed elastically to bulge out, and thereby it is not broken in the midst of deformation. A spacer excellent in durability is realized.

BRIEF DESCRIPTION OF THE DRAWINGS

FIG. 1 is a semisectional view of state of installation of pipe joint in the first embodiment.

FIG. 2 is partial sectional view of temporarily assembled state of the pipe joint in FIG. 1.

FIG. 3 is a front view of push ring in the first embodiment.

FIG. 4 is a front view of elastic ring and anti-slip ring in FIG. 2 as seen from the push ring side.

FIG. 5 is a partial sectional view of partly tightened state of clamp of the pipe joint in FIG. 2.

FIG. 6 is a partial sectional view of completely tightened state of clamp of the pipe joint in FIG. 2.

FIG. 7 is a partial sectional view of a state where force from water passing in the junction pipe in FIG. 6 is applied.

FIG. 8 is a front view of spacer in the second embodiment.

FIG. 9 is a front view of elastic ring in the second embodiment.

FIG. 10 is a front view of spacer and anti-slip ring supported on the elastic ring.

FIG. 11 is a side view semisectional diagram of spacer and anti-slip ring supported on the elastic ring.

FIG. 12 is a front view of push ring in the second embodiment.

FIG. 13 is a partial sectional view of temporarily assembled state of pipe joint in the second embodiment.

FIG. 14 is a partial sectional view of partly tightened state of clamp of the pipe joint in FIG. 13.

FIG. 15 is a partial sectional view of completely tightened state of clamp of the pipe joint in FIG. 13.

FIG. 16 is a partial sectional view of state of action of extracting force by passing water in the junction pipe in FIG. 15.

FIG. 17 is a partial sectional view of pipe joint in another embodiment.

FIG. 18 is a partial sectional view of pipe joint in further another embodiment.

FIG. 19 is a sectional view of protrusions provided in the spacer in further another embodiment.

FIG. 20 is a sectional view of protrusions provided in the spacer in further another embodiment.

FIG. 21 is a sectional view of spacer in further another embodiment.

FIG. 22 is a sectional view of temporarily assembled state of pipe joint having the spacer in FIG. 21.

FIG. 23 is a partial sectional view of completely tightened state of clamp of pipe joint having the spacer in FIG. 21.

FIG. 24 is a semisectional view of installation state of pipe joint in prior art.

FIG. 25 is a partial sectional view of pipe joint in prior art.

FIG. 26 is a partial sectional view of pipe joint in prior art.

FIG. 27 is a front view of push ring in prior art.

DETAILED DESCRIPTION OF THE PREFERRED EMBODIMENTS

Referring now to the drawings, preferred embodiments of the invention are specifically described below.

The First Embodiment

FIG. 1 is a semisectional view of state of installation of pipe joint in the first embodiment. The pipe joint shown in FIG. 1 couples the metal or resin junction pipe 1 watertightly, and comprises a pipe joint main body 2 disposed on the outer periphery of the junction pipe 1 to leave a peripheral gap, and a pair of push rings 3 disposed at both sides of the pipe joint main body 2. The pipe joint main body 2 and push rings 3 are composed to be tightened by T bolt and nut (corresponding to the clamp 4). The pipe joint main body 2 has flange-shaped protrusions 2a at both ends, and a dome-like shell 2b is integrally disposed between the protrusions 2a, and a pipe receptacle 2c is formed at the inner peripheral side of the protrusion 2a. The push ring 3 has a flange-shaped protrusion 3a confronting the protrusion 2a of the pipe joint main body 2, and a push ring receptacle 3c is formed at the inner peripheral side of the protrusion 3a. Between the pipe joint main body 2 and push rings 3, packing ring 5, anti-slip ring 6, spacer 7 and elastic ring 8 (corresponding to the elastic member) are installed, and are tightened by the bolt and nut (clamp 4). The components of the pipe joint are specifically described below.

FIG. 2 is partial sectional view of temporarily assembled state of the pipe joint in FIG. 1. In the temporarily assembled state, since the packing ring 5 and other members are preliminarily positioned in the radial direction and axial direction, the time of installation can be saved substantially. As shown in FIG. 2, in the protrusion 2a of the pipe joint main body 2, bolt through-holes are formed in the peripheral direction as many as the number of bolts and nuts which correspond to clamp 4 (for example, four). The pipe receptacle 2c is formed to spread toward the push ring 3 side, and includes a press-fit part 2d as a tubular surface parallel to the junction pipe 1 at the closing side, and a receiving hole 2e as a tubular surface parallel to the junction pipe 1 at the spreading side.

The packing ring 5 has a tip 5a at the pipe receptacle 2c side, and a base 5b at the push ring 3 side. The tip 5a has a diameter nearly same as the inside diameter of the pipe receptacle 2c so that the outer periphery may be temporarily stopped at the receiving hole 2e at the inlet of the pipe receptacle 2c. On the other hand, the base 5b has a diameter larger than the outside diameter of the tip 5a on the outer periphery only at the position linking with the tip 5a, and serves as a stopper 5c abutting against the pipe receptacle peripheral outer side 2f. As a result, the stopper 5c of the packing ring 5 abuts against the pipe receptacle peripheral outer side 2f, and is positioned in the axial direction, and the tip 5a of the packing ring 5 abuts against the receiving hole 2e at the inlet of the pipe receptacle 2c, and is positioned in the radial direction.

At the base 5b of the packing ring 5, a fillet 5e is formed to project to the push ring 3 side around the entire circumference of the push ring 3 side outer peripheral edge. Since the fillet 5e is formed to be engaged with a fillet 7e of the spacer 7, the packing ring 5 and spacer 7 can be easily positioned in the radial direction.

The packing ring 5 is preferred to be made of rubber, for example, SBR (styrene butadiene rubber) or others. The tip 5a of the packing ring 5 is preferred to be a soft part, having a hardness $H_A$ (hardness by durometer hardness test (type A) of JIS K 6253) of 60±5 degrees. On the other hand, the base 5b is preferred to be a rigid part, having a hardness $H_A$ of 90±5 degrees. The stopper 5c of the packing ring 5 is preferred to have a recess 5f at the side contacting with the pipe receptacle 2c. Action and effect of these components are described later.

FIG. 3 is a front view of push ring 3 of the pipe joint. The protrusion 3a of the push ring 3 also has bolt through-hole formed in the peripheral direction as many as the number of bolts and nuts which correspond to clamp 4 (for example, four) at the positions corresponding to the bolt through-holes at the pipe joint main body 2 side. The bolts and nuts which correspond to clamp 4 are inserted by way of the bolt through-holes of the push ring 3 and pipe joint main body 2, which are designed to be tightened. The push ring 3 has no separation position in the peripheral direction, and hence does not have diameter contracting mechanism or stopper boss as in the conventional stopper. As shown in FIG. 2, the push ring receptacle 3c is formed to spread toward the pipe joint main body 2 side, and has an opening 3b at spreading side, and a taper 3d as closing side. Elastic ring 8 and anti-slip ring 6 are disposed at the inner peripheral side of the opening 3b. FIG. 4 is a front view of elastic ring 8 and anti-slip ring 6 in FIG. 2 as seen from the push ring 3 side. The elastic ring 8 is an annular body, and has a sectional shape along the inner peripheral side of the opening 3b of the push ring 3. At the taper 3d side of the push ring 3, a recess 8a is formed, and the anti-slip ring 6 is provided at its inner peripheral side. The anti-slip ring 6 is preferred to have a shape to be engaged with the outer surface of the junction pipe 1 in its inner periphery in order to enhance the release preventive effect. It is also preferred to be formed of a material of high rigidity in order to enhance the durability. For example, an SUS ring having a sectional shape conforming to the internal peripheral tooth profile as shown in FIG. 2 may be used. The anti-slip ring 6 has one separated position in the peripheral direction, and is composed to be changeable in the diameter dimension. The inside diameter of the elastic ring 8 and anti-slip ring 6 is larger than the outside diameter of the junction pipe 1, and they are disposed at a peripheral gap on the outer circumference of the junction pipe 1 in temporarily assembled state.

The elastic ring 8 is preferred to be made of rubber, for example, SBR or others. It hardness HA is preferred to be 55 to 60 degrees.

The spacer 7 disposed between the packing ring 5 and elastic ring 8 has a sectional shape conforming to the side face of the pipe joint main body 2 of the elastic ring 8, and has a fillet 7e at the pipe joint main body 2 side as mentioned above, so as to be engaged with the fillet 5e of the packing ring 5. As a result, the pressing force of the push ring 3 transmitted through the elastic ring 8 can be securely transmitted to the packing ring 5, and it becomes easier to position the elastic ring 8 and packing ring 5 in the radial direction. The outside diameter of the spacer 7 is larger than the outside diameter of the pipe receptacle peripheral outer side 2f. The spacer 7 is preferably made of material not deforming elastically, such as POM (polyacetal resin).

From the temporarily assembled state in FIG. 2, the process until coupling the junction pipe 1 is explained. FIG. 5 is a partial sectional view of partly tightened state of bolts and nuts which correspond to clamp 4 of the pipe joint in FIG. 2. FIG. 6 is a partial sectional view of completely tightened state of bolts and nuts which correspond to clamp 4. FIG. 7 is a partial sectional view of a state where force from water running through the pipe is applied after completion of coupling of the junction pipe 1.

As shown in FIG. 5, when the push ring 3 is moved by tightening the bolts and nuts which correspond to clamp 4 in the state of inserting the junction pipe 1 in the temporarily assembled pipe joint, by the pressing force of the push ring 3, the elastic ring 8 and spacer 8 are moved to the pipe joint main body 2 side, and the packing ring 5 is compressed. The compressed packing ring 5 deforms elastically itself together with the stopper 5c, and invades into the pipe receptacle 2c. The tip 5a of the packing tightly joins with the press-fitting part 2d in wedge form, and is compressed to the outer periphery of the junction pipe 1, and the packing ring 5 is fitted, and the junction pipe 1 is coupled so that the liquid passing through the junction pipe 1 may not leak outside.

As mentioned above, since the anti-slip ring 6 is provided at the inner periphery of the elastic ring 8, by the pressure of the push ring 3, the packing ring 5 deforms elastically earlier than the elastic ring 8. As a result, after a sufficient compression of the packing ring 5 enough to withstand stopping of water, the anti-slip ring 6 is compressed, so that the junction pipe 1 may be bonded favorably.

Further as mentioned above, since the base 5b of the packing ring 5 is a rigid part, the pressing force of the push ring 3 is securely transmitted to the packing ring 5, and since the tip 5a is a soft part, the tightness and compressiveness are enhanced, and the sealing performance is improved. When the hardness $H_A$ of the stopper 5c as part of the base 5b is 90±5 degrees, it has an appropriate hardness and elastic deformation, and a sufficient stopper function is exhibited, and the temporarily assembled state is hardly collapsed, and it is easy to deform when invading the packing ring 5 into the pipe receptacle 2c. Since the recess 5f is provided at the side of abutting the stopper 5c to the pipe receptacle 2c, it is caught on the edge of the receiving hole 2e of the pipe receptacle 2c, and is deformed elastically by warping to the opposite side of the invading direction, so that the stopper 5c may be smoothly inserted into the pipe receptacle 2c.

When the packing ring 5 is pressed in to a certain extent, the outer portion of the spacer 7 abuts against the pipe receptacle peripheral outer side 2f, and fitting of the packing ring 5 to the pipe receptacle side 2c is over. By further tightening the bolts and nuts which correspond to clamp 4 in this state, the pressing force of the push ring 3 acts on the elastic ring 8, and the elastic ring 8 is deformed elastically as shown in FIG. 6. By the external pressure of the elastic deformation, the anti-slip ring 6 is pressed to the taper 3d side of the push ring 3, and is press-fitted into the taper 3d while contracting. As a result, the anti-slip ring 6 is compressed to the outer face of the junction pipe 1, and the junction pipe 1 is prevented from slipping out securely.

By passing water to the junction pipe 1 after completion of coupling, by the water pressure of passing water, an axial force acts on the junction pipe 1, and as shown in FIG. 7, the anti-slip ring 6 is engaged with the outer side of the junction pipe 1, and release preventive effect is exhibited, and the water-tightness is maintained by the packing ring 5. Since the anti-slip ring 6 is formed to be slidable with the junction pipe 1 at the inner periphery of a taper 3d, the conduit can be expanded or contracted at the time of earthquake or the like, and release of the junction pipe can be prevented.

The Second Embodiment

The second embodiment is similar to the first embodiment, except that the configuration of the push ring, elastic ring, and spacer differs as described below, and mainly different points are discussed, and explanation of common parts is omitted.

FIG. 8(a) is a front view of spacer as seen from the push ring side, and (b) and (c) are sectional views of arrow b and arrow c in (a), respectively. The spacer 15 has a plurality of protrusions 16 provided at specified pitch in the peripheral direction. The protrusion 16 comprises a consecutive portion 16b extended from the side of the spacer 15, and a tip 16a formed at the leading end. The spacer 15 is preferably made of resin, and when an external force acts on the tip 16a of the protrusion 16, the consecutive portion 16b is deflected so that the protrusion 16 may be inclined.

The outer periphery 16c of the tip 16a is formed to conform to the inner periphery of the push ring 19 mentioned below when the protrusion 16 is inclined. On the other hand, the inner periphery 16d of the tip 16a is a taper spreading toward the pipe joint main body 2 when the protrusion 16 is inclined, and is positioned to be nearly at same level as the taper 19d of the push ring 19. The functions on the basis of these shapes are described below. It is not limited by the number of shape of protrusions 16.

FIG. 9(a) is a front view of elastic ring as seen from the push ring side, and (b) and (c) are sectional views of arrow b and arrow c in (a), respectively. The elastic ring 17 has, as shown in FIG. 9(b), a sectional shape conforming to the inner periphery of the push ring 19, same as the elastic ring 8 in FIG. 2, and has a recess 17a at the push ring 19 side. The elastic ring 17 has a plurality of thin wall portions 18 provided at specified pitch in the peripheral direction. The thin wall portions 18 are formed at positions corresponding to the protrusion 16 of the spacer 15, and consecutive portions 16b of the protrusions 16 are engaged with the inner side of the thin wall portions 18. As a result, the spacer 15 can be held on the elastic ring 17.

FIG. 10 is a front view of spacer 15 and anti-slip ring 6 supported on the elastic ring 17, and FIG. 11 is a semisectional diagram in its side view. The anti-slip ring 6 is disposed at the inner side of the recess 17a of the elastic ring 17, and is disposed at the inner side of the inner periphery 16d of the protrusions 16 at specified pitch in the peripheral direction.

FIG. 12(a) is a front view of push ring as seen from the pipe joint main body side, and (b) and (c) are sectional views of arrow b and arrow c in (a), respectively. The push ring 19, same as the push ring 3 in FIG. 3, has bolt through-holes provided in protrusions 19a, and bolts and nuts which correspond to clamp 4 are inserted in the bolt through-holes of the push ring 19 and pipe joint main body 2, so as to be tightened. The push ring receptacle 19c spreading to the pipe joint main body 2 side has an opening 19b at spreading side, and a taper 19d at closing side. The push ring 19 has recess grooves 20 formed at specified pitch in the peripheral direction. The recess grooves 20 are formed in a taper form spreading toward the pipe joint main body 2 at positions corresponding to the protrusions 16 of the spacer 15, and the tips 16a of the protrusions 16 formed so as to contact internally.

FIG. 13 is a partial sectional view of partly assembled state of pipe joint in the embodiment. In this temporarily assembled state, same as in the case of FIG. 2, the packing ring 5 and other members are preliminarily positioned in the radial direction and axial direction. As mentioned above, the protrusions 16 of the spacer 15 are internally contacting with the recess grooves 20 of the push ring 19, and the spacer 15 and anti-slip ring 6 held by the elastic ring 17, and hence it is easier to position when assembling temporarily, and the temporarily assembled state is hardly collapsed, and it is easy to handle. FIG. 13 shows the section of the position forming the protrusions 16 of the spacer 15, and the section of the position not forming the protrusions 16 corresponds to the partial sectional view in FIG. 2. The relation of FIGS. 14 to 16 to FIGS. 5 to 7 is also the same.

From the temporarily assembled state in FIG. 13, the process up to joining of junction pipe 1 is explained. FIG. 14 is a partial sectional view of partly tightened state of bolts and nuts which correspond to clamp 4 of the pipe joint in FIG. 13. FIG. 15 is a partial sectional view of completely tightened state of bolts and nuts which correspond to clamp 4. FIG. 16 is a partial sectional view of state of action of extracting force by passing water after completion of joining of the junction pipe 1.

As shown in FIG. 14, with the junction pipe 1 inserted into the temporarily assembled pipe joint, bolts and nuts which correspond to clamp 4 are tightened to move the push ring 19, and same as in the first embodiment, by the pressing force of the push ring 19, the packing ring 5 deforms elastically, and invades into the pipe receptacle 2c, thereby tightly contacting in wedge form. The outer side 15d of the spacer 15 abuts against the pipe receptacle peripheral outer side 2f, and fitting of the packing ring 5 is complete.

In succession, by further tightening the bolts and nuts which correspond to clamp 4, the pressing force of the push ring 19 acts on the spacer 15 and elastic ring 17. That is, as shown in FIG. 15, the protrusions 16 of the spacer 15 move along the inner periphery (recess grooves 20) of the push ring receptacle 19c along with pressing force of the push ring 19, and the inner periphery 16d confronts the outer side of the junction pipe 1. As a result, the anti-slip ring is compressed to the outer face of the junction pipe 1. At this time, same as in the first embodiment, the anti-slip ring 6 is compressed by the elastic deformation of the elastic ring 17. The protrusions 16 are internally contacting with the recess grooves 20, and move along the taper of the recess grooves 20, and hence move smoothly and accurately.

Since a plurality of protrusions 16 are provided in the peripheral direction of the spacer 15, the anti-slip ring 6 is not locally contracted at the inner side of the tightened bolts and nuts which correspond to clamp 4, but can be contracted in a region somewhat spreading in the peripheral direction. Hence, the anti-slip ring 6 can be contracted uniformly in the peripheral direction, and can be smoothly press-fitted into the push ring receptacle 19c.

As shown in FIG. 15, the inner periphery 16d of the protrusions 16 confronting the outer side of the junction pipe 1 is tapered, spreading toward the pipe joint main body 2 side. When an axial force acts on the junction pipe 1 by water pressure by passing water or the like, as shown in FIG. 16, since the anti-slip ring 6 moves to the taper closing side, the anti-slip ring 6 can be more firmly pressed to the outer side of the junction pipe 1 by their cooperating actions.

Further, the inner periphery 16d of the protrusions 16 is positioned nearly at the same level as the inner periphery (corresponding to the inner periphery of the press-fitting region of the anti-slip ring 6) of the taper 19d of the push ring 19, and hence the moving route of the anti-slip ring 6 is assured. That is, in the event of earthquake or the like, the anti-slip ring 6 is slidable, together with the junction pipe 1, at the inner side of the protrusions 16 or inner side of the taper 19d of the push ring 19, and the conduit is expanded and contracted, and releasing of the junction pipe 1 is prevented. The depth or taper angle of recess grooves 20 of the push ring 19 are set so that the inner periphery 16d of the protrusions 16 may be positioned nearly at the same level as the taper 19d of the push ring 19, upon completion of tightening of the bolts and nuts which correspond to clamp 4.

Another Embodiment (1) In the foregoing embodiments, the pipe joint has spacer 7 and elastic ring 8, but instead of them, in the invention, for example, it may also have an elastic ring spacer 9 as shown in FIG. 17. The pipe joint shown in FIG. 17 has an elastic ring spacer 9 in place of the spacer and elastic ring, and other structure is same as that of the pipe joint in FIG. 2. The elastic ring spacer 9 has an assembled shape of spacer 7 and elastic ring 8 shown in FIG. 2. The packing ring 5 side of the elastic ring spacer 9 is a rigid part, and the anti-slip ring 6 side is preferred to be a soft part. Hence, the action and effect of the spacer as mentioned above and elastic ring can be preferably realized by the elastic ring sensor 9 only.

(2) The packing ring used in the pipe joint of the invention is not limited to the structure shown in the foregoing embodiments alone. For example, it may have a shape of packing ring 51 as shown in FIG. 25. In this case, the shape of the spacer or elastic ring spacer may be set properly depending on the shape of the packing ring.

(3) In the foregoing embodiments, the pipe joint main body 2 is interposed between two junction pipes 1, but as shown in FIG. 18, instead of the pipe joint main body 2, a junction pipe 10 may be used.

(4) The pipe joint of the invention is not always assembled preliminarily, but may be transported to the site of installation, in disassembled state of packing ring and other members, and assembled at the site.

(5) In the foregoing embodiments, the protrusions 16 are extended from the side of the spacer 15, but the invention is not limited to this example. For example, they may be formed as shown in FIG. 19 or FIG. 20. In FIG. 19, protrusions 22 made of other member from the spacer 21 are rotatably supported by the spacer 21. That is, as shown in FIG. 19(a), protrusions 22 having tips 22a and shafts 22b are supported by grooves 21a formed in the spacer 21. As a result, as shown in FIG. 19(b), the protrusions 22 are easily inclined rotated. In FIG. 20, protrusions 24 are linked to the side of the spacer 23 by way of bridge 25. As a result, as shown in FIG. 20(b), the bridge 25 is deflected by pressing force of the push ring 19, and the protrusions 24 move easily along the inner periphery of the push ring receptacle 19c. The bridge 25 is easily deflected so that the protrusions 24 may move smoothly, and it is set at a proper thickness not to be broken easily by move of the protrusions 24. In this configuration, when the push ring 19 is moved, the protrusions 22, 24 move smoothly along the inner periphery of the push ring receptacle 19c, and the easiness of installation is improved, and damage of protrusions or spacer can be prevented. If once used, it can be easily restored to the original shape, and it can be used again favorably.

(6) In other words, the spacer may be formed as shown in sectional structure in FIG. 21.

That is, same as shown in the second embodiment, the spacer 31 has the protrusions 32 extended from the side of the spacer 31 by way of coupling unit 32b, but the coupling unit 32b is connected to the outer side 32c of the protrusions 32, and the shape of the coupling unit 32b is formed relatively thin and long along the outer side 32c of the protrusions 32. A deep penetrating thin groove 33 is formed between the coupling unit 32b and protrusions 32. This groove 33 is formed nearly in same width from the root to the leading end, and as shown in FIGS. 22 and 23, when pressed to the push ring 19, the groove 33 is crushed, and the coupling unit 32b easily deforms elastically and bulges out as shown in FIG. 23, and excessive force does not act on the coupling unit 32b. That is, the coupling unit 32b is securely prevented from being broken in the midst of deformation.

FIG. 22 is a partial sectional view showing temporarily assembled state of pipe joint in the embodiment. In this temporarily assembled state, same as in the case of FIGS. 2 and 13, the packing ring 5 and other members are preliminarily positioned in the radial direction and axial direction. As mentioned above, the protrusions 32 of the spacer 31 are internally contacting with the recess grooves 20 of the push ring 19, and the spacer 31 and anti-slip ring 6 are held by the elastic ring 27, so that it is easy to position when assembling temporarily, and since the temporarily assembled state is hardly collapsed, it is easy to handle.

By tightening the bolts and nuts not shown, as shown in FIG. 23, the pressing force of the push ring 19 acts on the spacer 31 and elastic ring 27, and the coupling unit 32b deforms elastically and bulges out. That is, the protrusions 32 of the spacer 31 move along the inner periphery (recess grooves 20) of the push ring receptacle by the pressing force of the push ring 19, and the inner periphery 32d of the protrusions 32 confront the outer side of the junction pipe 1. As a result, the anti-slip ring 6 is compressed to the outer side of the junction pipe 1. At this time, same as in the second embodiment, the anti-slip ring 6 is press-fitted by elastic deformation of elastic ring 27. The protrusions 32 move along the taper of the recess grooves 20 while internally contacting with the recess grooves 20, and hence move smoothly and accurately.

Since a plurality of protrusions 32 are provided in the peripheral direction of the spacer 31, the anti-slip ring 6 is not locally contracted at the inner side of the tightened bolts and nuts, but can be contracted in a region somewhat spreading in the peripheral direction, which same as in the second embodiment. Hence, the anti-slip ring 6 can be uniformly contracted in the peripheral direction, and can be smoothly press-fitted into the push ring receptacle 19c.

What is claimed is:

1. A pipe joint comprising:
a push ring having a tapered receptacle and fitted to a junction pipe;
a pipe joint main body having a tapered receptacle and fitted to the junction pipe, said tapered receptacle of the pipe joint main body facing the tapered receptacle of the push ring;
a clamp clamping the push ring and the pipe joint main body by moving the push ring toward the pipe joint main body;
a packing ring disposed between the pipe joint main body and the junction pipe and elastically fitted in the tapered receptacle of the pipe joint main body against an outer surface of the junction pipe;
an anti-slip ring disposed at the tapered receptacle of the push ring and being in contact with the outer surface of the junction pipe, said anti-slip ring being cleaved at one position;
an elastic member disposed between the push ring and the packing ring and pressing the anti-slip ring toward the tapered receptacle of the push ring and the outer surface of the junction pipe; and
a spacer disposed between the packing ring and the elastic member and abutting against an inner peripheral surface of the tapered receptacle of the pipe joint main body,
wherein the spacer is provided with a protrusion contacting and moving along an inner periphery of the tapered receptacle of the push ring to press, the anti-slip ring against the outer surface of the junction pipe.

2. The pipe joint of claim 1, wherein the protrusion is composed of multiple protrusions provided at intervals along a circumference of the spacer.

3. The pipe joint of claim 2, wherein the protrusions are connected to the spacer with a coupling member which is thin and elastic.

4. A pipe joint comprising:
push rings, having a protrusion on an outer circumference and fitted to an outer circumference at one end of a junction pipe,
a pipe or pipe joint main body, having a protrusion facing the push ring protrusion, having a pipe receptacle expanding toward the push rings at the inner side of this protrusion, and fitted to the outer circumference of the junction pipe across a peripheral gap,
a clamp, capable of moving and operating the push rings, in a direction of the pipe or pipe joint main body,
packing rings, disposed between inner and outer circumferences of the pipe or pipe joint main body, and junction pipe, and fitted into the pipe receptacle by an elastic deformation generated by a pressing force of the push rings moving by operation of the clamp, and
an anti-slip ring disposed between inner and outer circumferences of the push rings and junction pipe, and separated at one position in the circumferential direction,
wherein the push rings have an annular form not having a separated position in the peripheral direction, and a tapered push ring receptacle spreading toward the pipe or pipe joint main body at its inner peripheral side,
elastic members disposed between the push rings and packing rings, and by the elastic deformation caused by the pressing force of the push rings moved by operation of the clamp, the anti-slip ring is compressed to the junction pipe outer surface while press-fitting the anti-slip ring into the push ring receptacle, and
spacers disposed between the packing rings and elastic members, and abutting against an inner peripheral surface of the receptacle by the pressing force of the push rings moved by operation of the clamp,
wherein each of the spacers is provided with protrusions moving along the inner periphery of the push ring receptacle along with the pressing force of the push ring moved by operation of the clamp, and compressing the anti-slip ring against the outer side of the junction pipe, and
wherein at positions confronting the protrusions of the push ring receptacle, recess grooves, spreading in a taper toward the pipe or pipe joint main body, are disposed to internally contact with the protrusions.

5. The pipe joint of claim 4, characterized in that the protrusions are provided along a periphery of the spacer at a certain distances from each other.

6. A pipe joint comprising:
push rings, having a protrusion on an outer circumference and fitted to an outer circumference at one end of a junction pipe,
a pipe or pipe joint main body, having a protrusion facing the push ring protrusion, having a pipe receptacle expanding toward the push rings at the inner side of this protrusion, and fitted to the outer circumference of the junction pipe across a peripheral gap,
a clamp, capable of moving and operating the push rings, in a direction of the pipe or pipejoint main body,
packing rings, disposed between inner and outer circumferences of the pipe or pipe joint main body, and junction pipe, and fitted into the pipe receptacle by an elastic deformation generated by a pressing force of the push rings moving by operation of the clamp, and
an anti-slip ring disposed between inner and outer circumferences of the push rings and junction pipe, and separated at one position in the circumferential direction,
wherein the push rings have an annular form not having a separated position in the peripheral direction, and a tapered push ring receptacle spreading toward the pipe or pipe joint main body at its inner peripheral side,
elastic members disposed between the push rings and packing rings, and by the elastic deformation caused by the pressing force of the push rings moved by operation of the clamp, the anti-slip ring is compressed to the junction pipe outer surface while press-fitting the anti-slip ring into the push ring receptacle, and
spacers disposed between the packing rings and elastic members, and abutting against an inner peripheral surface of the receptacle by the pressing force of the push rings moved by operation of the clamp,
wherein each of the spacers is provided with protrusions moving along the inner periphery of the push ring receptacle along with the pressing force of the push ring moved by operation of the clamp, and compressing the anti-slip ring against the outer side of the junction pipe, and
wherein a surface confronting the junction pipe outer side of the protrusions moves along the inner periphery of the push ring receptacle forming a taper spreading toward the pipe or pipe joint main body, and is positioned nearly on the same level as the inner circumference of the press-fitting region of the anti-slip ring in the push ring receptacle.

* * * * *

UNITED STATES PATENT AND TRADEMARK OFFICE
CERTIFICATE OF CORRECTION

PATENT NO. : 7,354,073 B2
APPLICATION NO. : 11/092215
DATED : April 8, 2008
INVENTOR(S) : Kouichi Sakamoto It is certified that error appears in the above-identified patent and that said Letters Patent is hereby corrected as shown below:

On the title page: Item (57) ABSTRACT, line 4, delete "the joint" and insert --the pipe joint--, therefor.
Column 8/line 5, delete "HA" and insert --$H_A$--, therefor.
Column 13/line 30, in claim 1, delete "press," and insert --press--, therefor.
Column 14/line 28, in claim 6, delete "pipejoint" and insert --pipe joint--, therefor.

Signed and Sealed this

Thirty-first Day of March, 2009

JOHN DOLL
*Acting Director of the United States Patent and Trademark Office*